(12) United States Patent
Yasukawa et al.

(10) Patent No.: US 11,167,687 B2
(45) Date of Patent: Nov. 9, 2021

(54) OBJECT DETECTION SYSTEM

(71) Applicant: Hitachi Automotive Systems, Ltd., Hitachinaka (JP)

(72) Inventors: Takakiyo Yasukawa, Hitachinaka (JP); Tatsuhiko Monji, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/631,680

(22) PCT Filed: Aug. 8, 2018

(86) PCT No.: PCT/JP2018/029713
§ 371 (c)(1),
(2) Date: Jan. 16, 2020

(87) PCT Pub. No.: WO2019/044434
PCT Pub. Date: Mar. 7, 2019

(65) Prior Publication Data
US 2020/0148097 A1 May 14, 2020

(30) Foreign Application Priority Data
Aug. 28, 2017 (JP) .............................. JP2017-163370

(51) Int. Cl.
*F21S 8/00* (2006.01)
*B60Q 1/24* (2006.01)
*B60Q 1/14* (2006.01)
(52) U.S. Cl.
CPC ................. *B60Q 1/24* (2013.01); *B60Q 1/14* (2013.01)

(58) Field of Classification Search
CPC .. B60Q 1/24; B60Q 2300/41; B60Q 2300/42; B60Q 1/1423; B60Q 1/143;
(Continued)

(56) References Cited

U.S. PATENT DOCUMENTS

2020/0062168 A1* 2/2020 Yuchi ..................... B60Q 1/085
2020/0112666 A1* 4/2020 Fujimoto ............. G06K 9/4604

FOREIGN PATENT DOCUMENTS

JP 2009-83824 A 4/2009
JP 2010-111261 A 5/2010
(Continued)

OTHER PUBLICATIONS

International Search Report (PCT/ISA/210) issued in PCT Application No. PCT/JP2018/029713 dated Oct. 30, 2018 with English translation (five (5) pages).
(Continued)

*Primary Examiner* — William J Carter
*Assistant Examiner* — Omar Rojas Cadima
(74) *Attorney, Agent, or Firm* — Crowell & Moring LLP

(57) ABSTRACT

Provided is an object detection system which enables detection of a body of interest without causing any disturbance outside a vehicle even if the body of interest is present in a restricted-illumination area. In accordance with the timing whereby an imaging module captures an image of an object in the restricted-illumination area and on the basis of the result of image processing by an image processing module, an illumination control module controls the start and end of illumination of the restricted-illumination area by an illumination module.

7 Claims, 23 Drawing Sheets

(58) Field of Classification Search
CPC ...... B60Q 2300/3321; B60Q 2300/312; B60Q 2300/314; B60Q 2300/054; B60Q 2300/056; G06K 9/00825; G06K 9/00791; G06K 9/00805; G06K 9/2027; G06K 9/209; G06K 9/2018; G06K 9/4604; G06K 9/4661; G01J 1/4204; G06T 2207/30252; G06T 5/50; G08G 1/166; H04N 5/2351; H04N 5/2253; H04N 5/2352; H04N 5/2355; H04N 5/2357; H04N 5/243; H04N 5/35518; H04N 5/35563; H04N 5/3559; H04N 5/363; H04N 5/365; H04N 5/367; H04N 5/3698; H04N 5/374; H04N 5/37455; H04N 5/37457; H04N 5/378; H04N 5/379; H04N 7/183; B60S 1/0844; B60W 2050/0043; B60W 50/00
USPC ........................................................ 362/459
See application file for complete search history.

(56) References Cited

FOREIGN PATENT DOCUMENTS

| | | |
|---|---|---|
| JP | 2011-84237 A | 4/2011 |
| JP | 2013-119357 A | 6/2013 |

OTHER PUBLICATIONS

Japanese-language Written Opinion (PCT/ISA/237) issued in PCT Application No. PCT/JP2018/029713 dated Oct. 30, 2018 (four (4) pages).

* cited by examiner

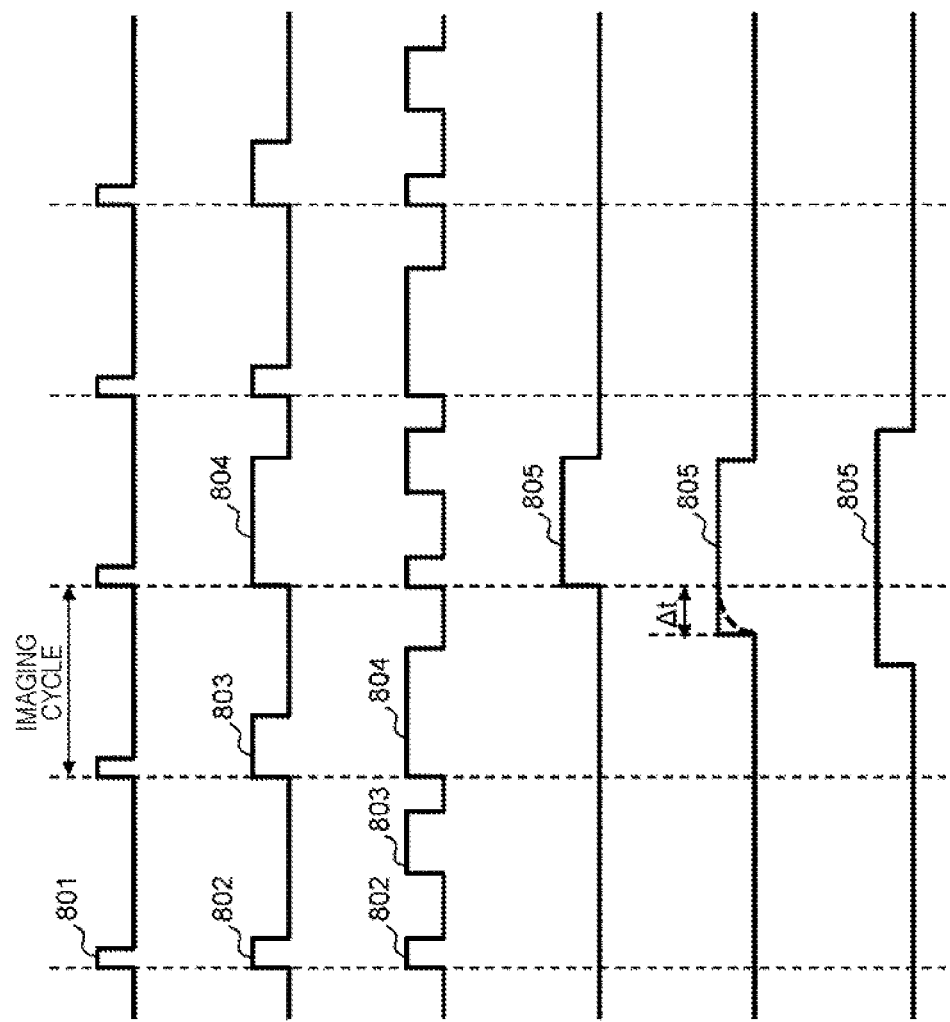

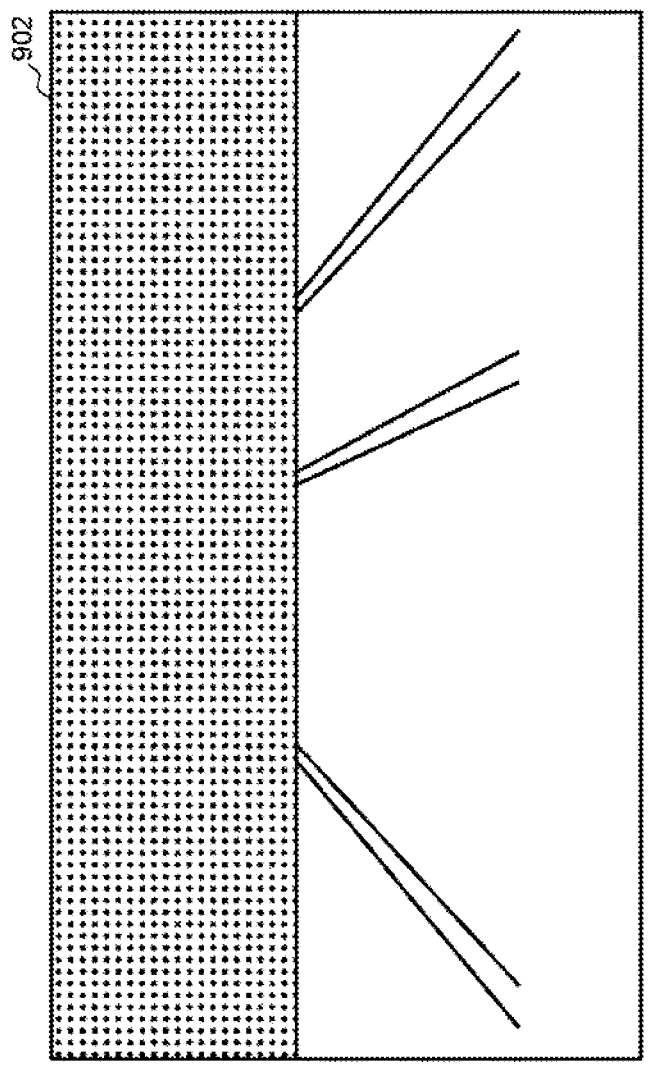

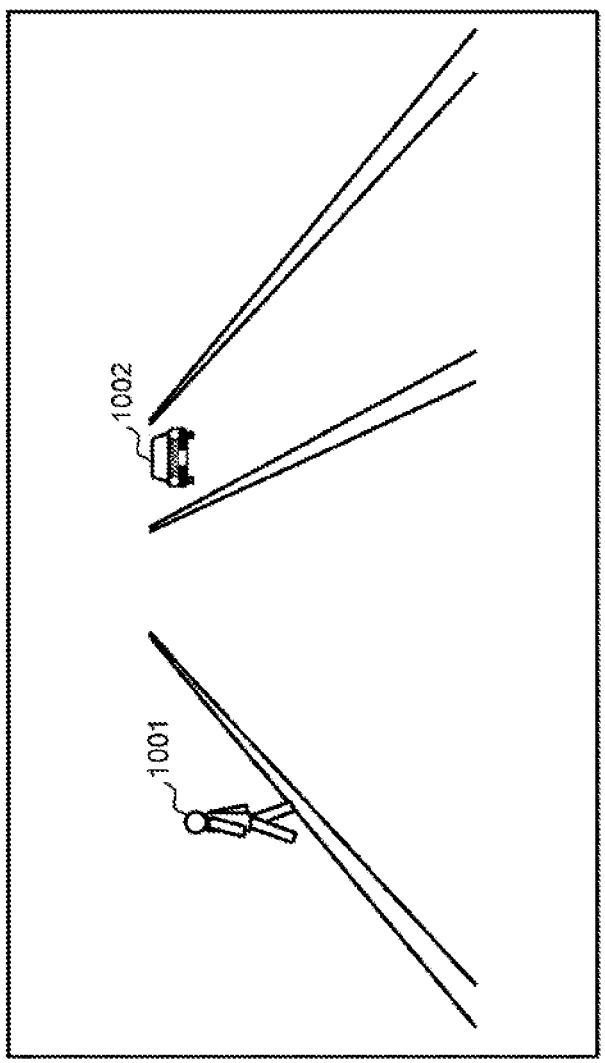

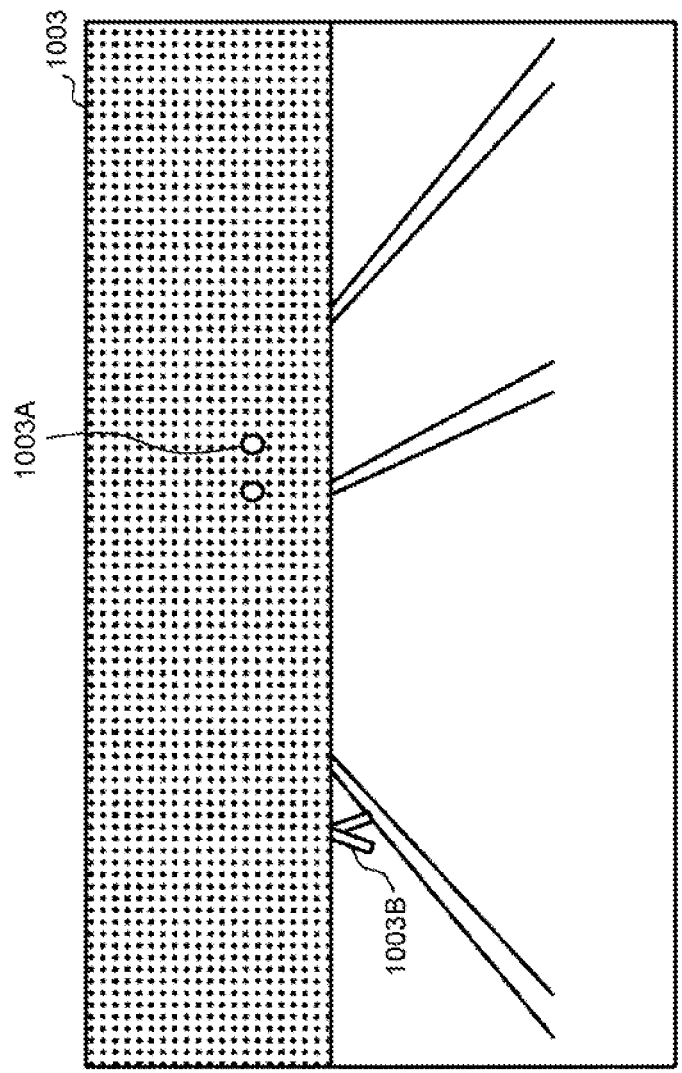

OBJECT DETECTION SYSTEM

TECHNICAL FIELD

The present invention relates to an object detection system, and, for example, a system that is mounted on a vehicle and is applicable or adaptable to traveling control support of the vehicle.

BACKGROUND ART

Currently, various driving support systems are applied to automobiles. As this type of driving support system, there is a pedestrian detection system that detects a pedestrian and gives a warning to a driver, and assists vehicle control such as steering and braking.

The pedestrian detection system captures ambient light and reflected light from a headlight from a visible camera, and detects a pedestrian using an image captured by the camera. Meanwhile, since it is difficult to detect pedestrians that are not illuminated at night, in recent years, there are systems that can detect pedestrians on the basis of imaging information of a far-infrared camera.

However, in scenes where it is difficult to obtain temperature contrast between the pedestrian and the background (road surface, etc.), there is a problem that the pedestrian cannot be detected, so that the image from the visible light camera is also important for detecting the pedestrian.

On the other hand, when the vehicle is traveling at a low beam at night, which is more often than the case where the vehicle is traveling at a high beam, headlight does not reach far away. Therefore, for the driver, there is a problem that detection of pedestrians is delayed.

In view of this, JP 2009-83824 A proposes a vehicular pedestrian detection device provided with imaging means for imaging the periphery of the vehicle and pedestrian detection means for determining whether or not an object imaged by the imaging means is a pedestrian. In the vehicular pedestrian detection device, the pedestrian detection means includes complement determination means for determining whether or not the imaged object can be complemented as a pedestrian, and light switching means for switching a headlight provided in the own vehicle from a low beam to a high beam when the complement determination means determines that complementation is possible. The pedestrian detection means detects a pedestrian on the basis of an imaging result after the light is switched to a high beam. According to the vehicular pedestrian detection device, even if the vehicle is in a low beam traveling state, the light is switched to a high beam when it is determined that the imaged object can be complemented as a pedestrian. Therefore, there is an advantage that detection of a pedestrian is not delayed.

CITATION LIST

Patent Literature

PTL 1: JP 2009-83824 A

SUMMARY OF INVENTION

Technical Problem

However, in the above conventional vehicular pedestrian detection device, when the headlight is switched from a low beam to a high beam, there is a risk of causing disturbance such as dazzlement to an oncoming vehicle or saturation of the sensor mounted on the oncoming vehicle. Therefore, an object of the present invention is to provide an object detection system capable of detecting a target object even if the target object exists in a limited-illumination area without causing such a kind of disturbance outside the vehicle.

Solution to Problem

In order to achieve the above-described object, the present invention is an object detection system that detects an object outside a vehicle and provides a control device of the vehicle with detection information. The object detection system includes an illumination module for illuminating the object, an illumination control module that controls the illumination module, an imaging module that images the object, and an image processing module that processes an image in which the object is captured. In accordance with timing at which the imaging module images an object in a limited-illumination area, the illumination control module controls start and end of illumination to the limited-illumination area by the illumination module on a basis of a result of image processing by the image processing module.

Advantageous Effects of Invention

According to the present invention, it is possible to provide an object detection system capable of detecting a target object even if the target object exists in the limited-illumination area without causing disturbance outside the vehicle.

BRIEF DESCRIPTION OF DRAWINGS

FIGS. 8A to 8F are examples of a timing chart of imaging and lighting of a high beam.

FIG. 9B is an example of a captured video during night low beam travel.

FIG. 10A is another example of a captured video during night high beam travel.

FIG. 10B is another example of a captured video during night low beam travel.

DESCRIPTION OF EMBODIMENTS

Figure 1:
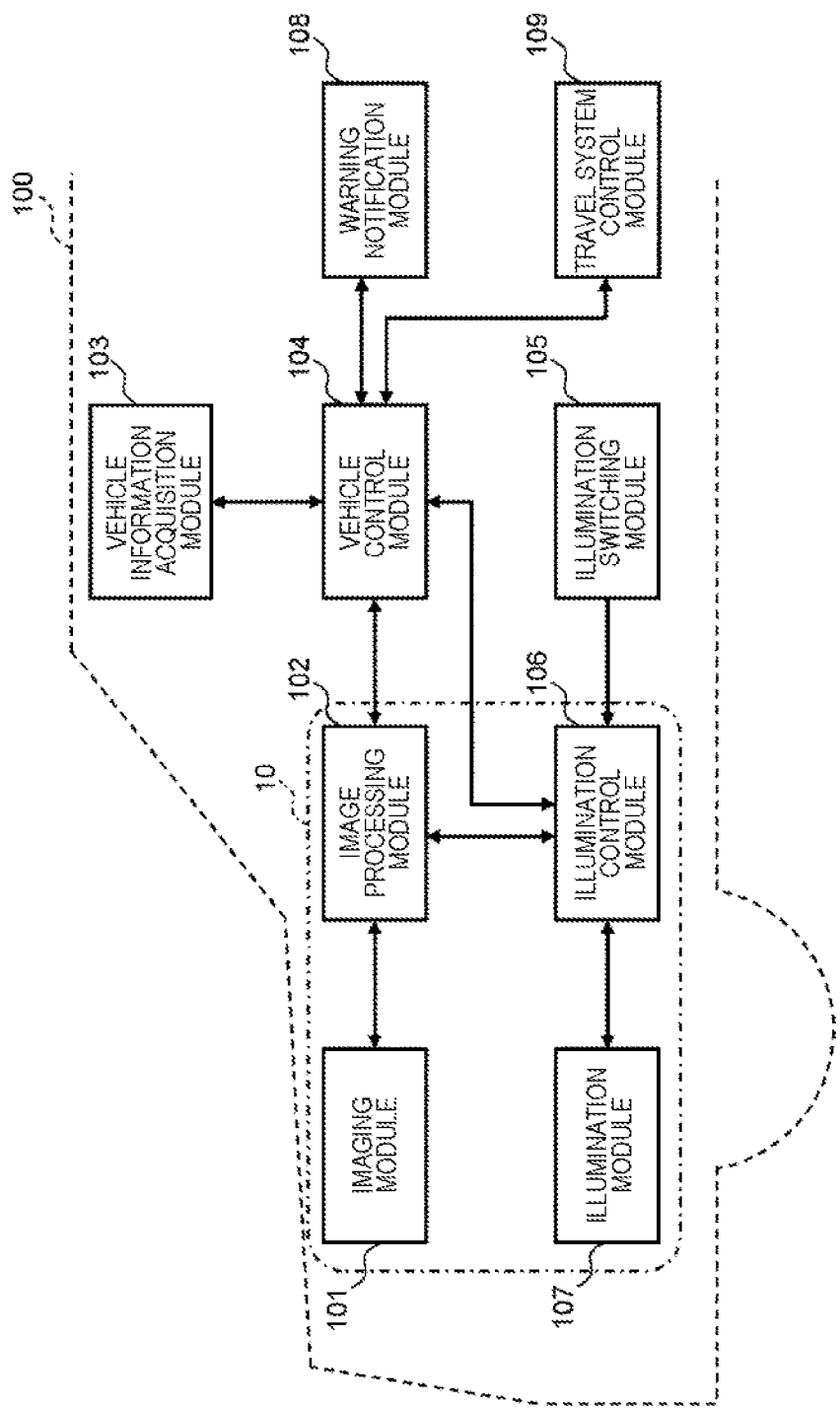
FIG. 1 is an example of a functional block diagram of an in-vehicle device including an object detection system.

Hereinafter, embodiments of the present invention will be described with reference to the drawings. In the following embodiments, an object detection system applied to an automobile will be described. FIG. 1 is an example of a functional block diagram of an in-vehicle device 100 including an object detection system 10. This functional block diagram of the in-vehicle device shows a configuration related to an object detection system, and does not show all the components as the in-vehicle device, for example. An object (detection target object) is mainly a person (low-speed moving body) as a pedestrian, and may include a preceding traveling vehicle, an oncoming vehicle, an animal, a structure on a road/road shoulder, or the like. Cars may include bicycles, two-wheeled vehicles, and four-wheeled vehicles.

The object detection system 10 includes an imaging module 101, an image processing module 102, an illumination control module 106, and an illumination module 107. The in-vehicle device 100 includes, in addition to the object detection system 10, a vehicle information acquisition module 103, a vehicle control module 104, an illumination switching module 105, a warning notification module 108, and a traveling system control module 109. Note that the term "module" is a configuration realized by hardware, software, or a combination of both, and may be expressed in another word such as "unit", "means", "device", or "part".

Next, the object detection system 10 will be described in detail. The object detection system 10 detects a detection target object (pedestrian, oncoming vehicle, preceding vehicle, or the like). As described above, in addition to the imaging module 101 and the image processing module 102, the object detection system 10 includes the illumination module 107 for illuminating the detection target so as to enable detection of the detection target even in a state where the visibility of the driver at nighttime or the like is lowered, and the illumination control module 106 for the illumination module 107.

The imaging module 101 captures a video of the outside of the vehicle, and transfers the captured video (or image) to the image processing module 102. The imaging module 101 may be, for example, a visible camera, a (far) infrared camera, or a hybrid camera of both. Furthermore, the imaging module 101 may be, for example, a monocular camera or a stereo camera. Further, the imaging module 101 and the illumination module 107 may be integrated.

Figure 2:
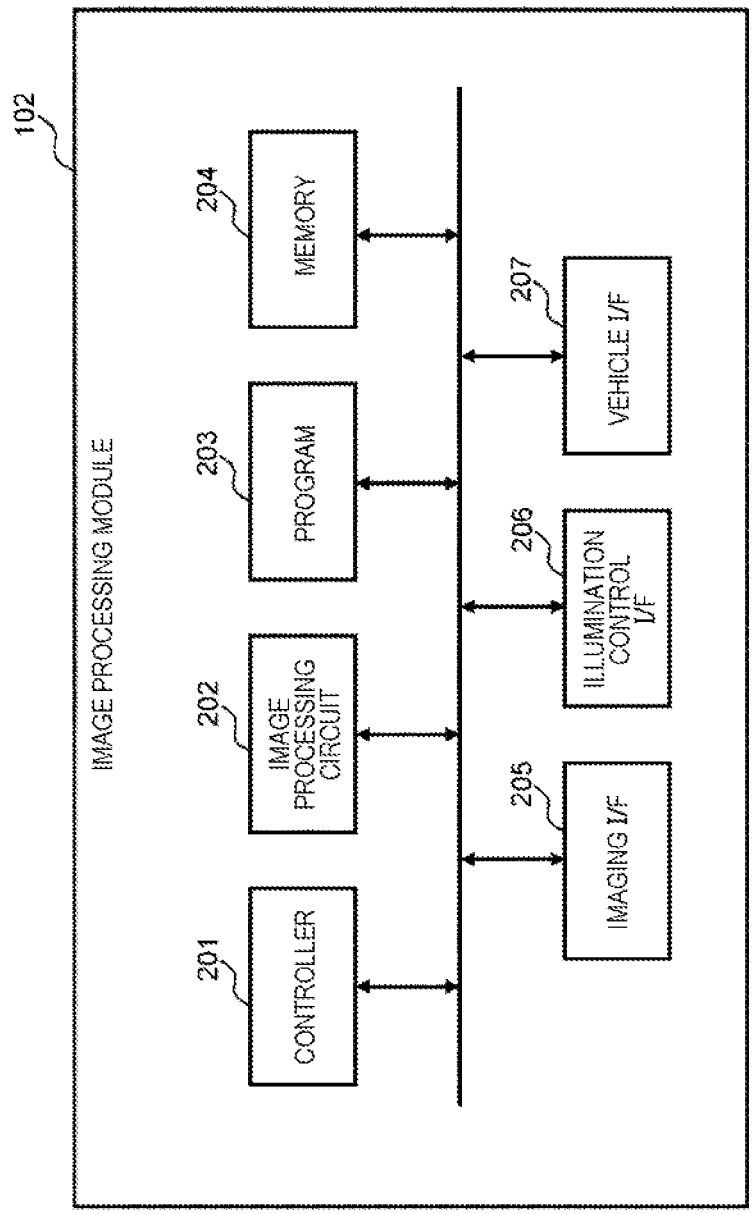
FIG. 2 is a block diagram showing a detailed configuration of an image processing module.

The image processing module 102 performs image processing on the captured video (captured image) received from the imaging module 101. The image processing module 102 can determine setting information (for example, imaging timing, imaging period of time, and the like) for imaging by the imaging module 101, transfers the setting information to the imaging module 101, and sets it. The image processing module 102 maybe an electronic control unit (ECU) for camera control, and may be, for example, an image processing LSI as shown in FIG. 2 described below.

The illumination control module 106 receives information about processing of the captured image from the image processing module 102, receives information about the traveling state and the control state of the vehicle from the vehicle control module 104, receives a signal for switching between the low beam and the high beam by the driver from the illumination switching module 105, decides, selects, and determines an optimal illumination state, an optimal illumination mode, and the like, sets them to the illumination module 107, to thereby realize an optimal headlight emission mode. The illumination control module 106 may be configured of, for example, a lamp control ECU. Note that the illumination state is not limited to the two modes, i.e., low beam and high beam, but may have three or more modes.

The illumination module 107 includes a headlight that irradiates the front of the vehicle and its drive circuit. The illumination module 107 switches the illumination method between a mode of irradiating the front of the vehicle and a mode of irradiating far away, for example, by the illumination control module 106. The former is achieved by lighting a low beam bulb, while the latter is achieved by lighting a high beam bulb. Note that one valve maybe switched between low and high. The headlight may be of a type using a bulb or a type in which a plurality of light emitting diodes (LEDs) respectively capable of controlling the illumination method are mounted. The latter can illuminate by dividing the irradiation area finely.

The vehicle information acquisition module 103 acquires vehicle information including a traveling state such as a vehicle speed and an operating state such as a steering angle from a sensor or the like via a controller area network (CAN), and transmits it to the vehicle control module 104.

The vehicle control module 104 is connected to the vehicle information acquisition module 103, the illumination control module 106, the warning notification module 108, and the traveling system control module 109.

The vehicle control module 104 issues, to the warning notification module 108, a drive signal for outputting a warning when determination is made that a warning (for example, pedestrian attention) regarding the traveling state of the vehicle is required for the driver, on the basis of the detection information of pedestrians by the image processing module 102 or on the basis of this detection information and the vehicle information from the vehicle information acquisition module 103. The warning notification module 108 may be a liquid crystal monitor, a speaker, or the like, for example.

The illumination switching module 105 outputs designation information to the illumination control module 106 when an illumination state (low beam or high beam) is designated by a manual operation of the driver of the vehicle.

FIG. 2 is a block diagram showing a detailed configuration of the image processing module 102. The image processing module 102 includes a controller 201, an image processing circuit 202, a program 203, a memory 204, an imaging I/F 205, an illumination control I/F 206, and a vehicle I/F 207. These are connected to each other by a communication bus.

The controller 201 includes a processor such as a central processing unit (CPU) and operates the image processing circuit 202 on the basis of the program 203 in which processing necessary for image processing is described to thereby perform image processing of a captured image. When the controller 201 executes the program 203, the memory 204 is used as a work area.

The imaging I/F 205 is an interface for setting conditions for the imaging module 101 to capture a video and performing transmission for taking in the captured video. The illumination control I/F 206 is an interface for transmitting information about illumination switching (low or high beam) to the illumination module 107. The vehicle I/F 207 is an interface for acquiring vehicle information from the vehicle information acquisition module 103 via the vehicle control module 104, and transmitting information based on the result of image processing to the vehicle control module 104. The image processing module 102 is connected to the imaging module 101 via the imaging I/F 205, is connected to the illumination control module 106 via the illumination control I/F 206, and is connected to the vehicle control module 104 via the vehicle I/F 207.

The imaging module 101 includes an imaging element that converts a captured image into an electrical signal. In order to effectively acquire information necessary for recognizing the detection target object, it is preferable that the imaging element has a light receiving surface in which a plurality of light receiving elements are aligned.

Figure 3:
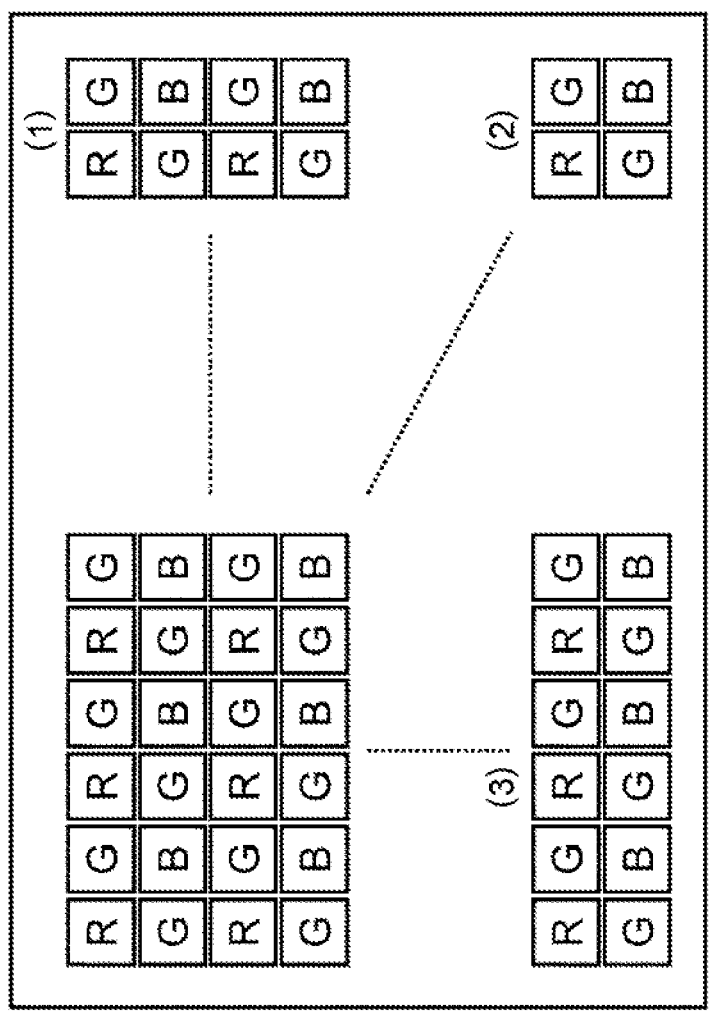
FIG. 3 is a schematic diagram according to an example of an imaging element.

FIG. 3 shows an example (schematic diagram) of an imaging element. The imaging element has an arrangement in which a plurality of light receiving elements (R elements, G elements, B elements) of color pixels are regularly aligned. "R" is a light receiving element (R element) that detects a red wavelength band, "G" is a light receiving element (G element) that detects a green wavelength band, and "B" is a light receiving element (B element) that detects a blue wavelength band. Each light receiving element detects a component of each corresponding color by band limitation that reduces sensitivity so as to receive a specific wavelength by the filter configuration.

The imaging element includes an array of a plurality of light receiving elements having different color pixels. Therefore, the image processing module 102 performs complementary processing to reproduce each color projected on the area of each element. For example, the complementary processing may take an average value of the components in the wavelength band between adjacent elements ((1)-(3)). As in (1), the green component (G component) of the R element may be an average value of four G elements obliquely adjacent to each other, and similarly, the blue component (B component) of the R element may be an average value of two upper and lower B elements.

Figure 4:
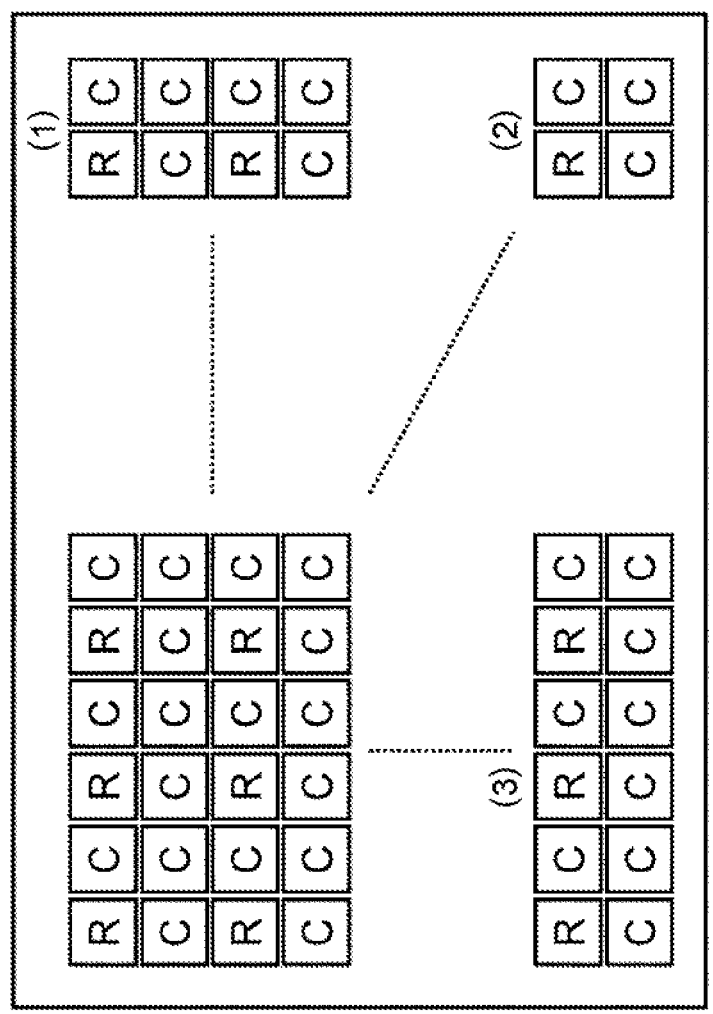
FIG. 4 is a schematic diagram according to another example of an imaging element.

FIG. 4 shows another example of an imaging element. When the image processing module 102 acquires a color image of an object, a light receiving element (C element) of a clear pixel may be applied to the imaging element in a situation where it is not necessary to strictly separate color components. Comparing the arrangement of the light receiving elements in the imaging element with that of FIG. 3, the G element and the B element are replaced with C elements. Since the clear pixel has no color restriction, it can receive all frequency components. Therefore, as shown in FIG. 4, when at least one of the light receiving elements of the color pixel is replaced with a light receiving element of the clear pixel, the complementary processing can be performed in a simple manner as compared with the case where the light receiving elements of the color pixel are arranged (FIG. 3). As a result, an improvement in dynamic range is expected.

In the arrangement shown in FIG. 4, red pixel elements (R elements) remain. This is because identification of red is necessary for recognizing the taillight of a previous traveling vehicle. By doing so, the red color can be reliably identified, and the complementary processing can be reduced.

Figure 5:
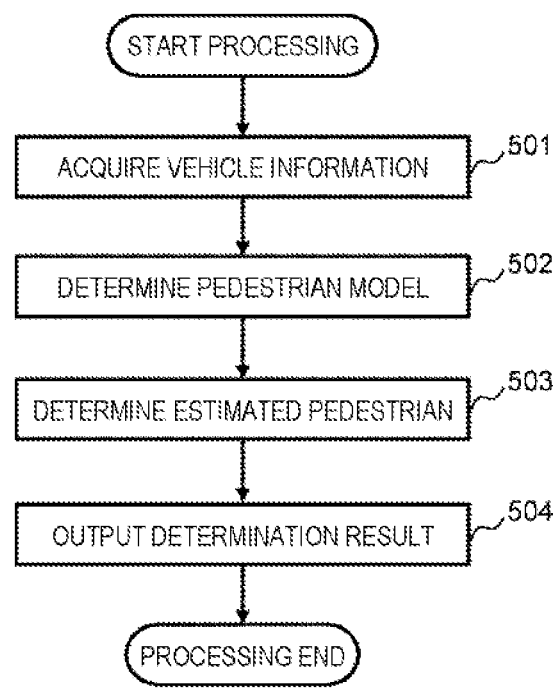
FIG. 5 is a flowchart showing an example of a procedure of a pedestrian (specific target object) detection process.

Next, an operation in which the object detection system 10 (FIG. 1) takes a front image of the vehicle from the imaging module 101 (camera) and detects a pedestrian will be described. FIG. 5 is a flowchart illustrating an example of a procedure of a pedestrian detection process. The vehicle information acquisition module 103 acquires vehicle information such as speed and steering angle (step S501). The vehicle information acquisition module 103 transmits vehicle information to the image processing module 102 via the vehicle control module 104.

In step S502, the controller 201 of the image processing module 102 operates the image processing circuit 202, and the image processing circuit 202 determines a "pedestrian model" stored in the memory 204 on the basis of the vehicle information. The pedestrian model is model information set for performing pedestrian pattern determination, and a human body may be specified by the aspect ratio of the image. In a detailed pedestrian model, information such as color and brightness of the exposed parts (face, hand) may be added to the model information.

Next, the image processing circuit 202 compares the video received from the imaging module 101 with a predetermined reference to determine whether or not there is a possibility that the imaging target is a pedestrian. If the videos include not only the whole image of the pedestrian but also a part of the pedestrian (for example, leg, lower body), the image processing circuit 202 categorizes the videos as an "estimated pedestrian" having a possibility of being a pedestrian. The image processing circuit 202 accumulates and stores in the memory 204 the captured image and the presence/absence of an "estimated pedestrian" corresponding thereto at each imaging timing.

Next, in step S503, the image processing circuit 202 refers to the memory 204, extracts the features (such as contours) of the video categorized as the "estimated pedestrian", and/or extracts the motion pattern (for example, information showing the motion of the pedestrian) of the continuous videos, to thereby extract the feature pattern of the video classified as the "estimated pedestrian".

The image processing circuit 202 compares the feature pattern with the video model. The image processing circuit 202 determines whether or not the video of the "estimated pedestrian" is the whole of the pedestrian or the video is part of the pedestrian. If the determination is affirmative, the image processing circuit 202 identifies the imaging target as a pedestrian. The fact that this video can be identified as part of a pedestrian also means that the imaged object can be complemented as a pedestrian. Therefore, the image processing circuit 202 may complement the estimated pedestrian and then perform pattern matching with the pedestrian model. As for complementation, publicly known ones including PTL 1 described above may be referred to.

In step S504, the image processing circuit 202 directly outputs the determination result (pedestrian identification result) in step S503 to the illumination control module 106. As described later, the illumination control module 106 turns on the illumination module 107 to be a high beam when the estimated pedestrian is determined. If it is determined in step S503 that the imaging target is not a pedestrian, step S504 may be skipped.

Next, the operation in which the object detection system 10 controls illumination on the basis of the determination result of FIG. 5 will be described on the basis of the flowchart of FIG. 6. The description will be made on the assumption that the headlight for illumination is of a single lamp type and the headlight can be switched from the low beam to the high beam. Upon receiving the identification information of the estimated pedestrian from the image processing module 102 (step 601: Y), the illumination control module 106 switches the headlight (illumination module 107) to high beam irradiation at the imaging timing for the pedestrian (step 602). The imaging module 101 images the estimated pedestrian at the timing when the headlight is switched to the high beam (step 603).

The illumination control module 106 switches the high beam to the low beam in accordance with the imaging timing of the in-vehicle camera (illumination module 107) (step 604). Thereby, the illumination control module 106 can limit the lighting time of the high beam within the range of the imaging cycle. As a result, the illumination control module 106 can limit the lighting time of the high beam to, for example, a range between 2 msec to 50 msec approximately, while enabling imaging of the estimated pedestrian with the high beam. Since the lighting time of the high beam is extremely short, dazzlement to other vehicles, saturation of sensors of other vehicles, or the like can be avoided.

The image processing circuit 202 compares the video captured during the high beam lighting period with the pedestrian model to analyze whether or not the video shows a pedestrian, in other words, determines the authenticity of whether or not the estimated pedestrian is correct as a pedestrian (step 606). When the determination result is affirmative, the image processing circuit 202 outputs affirmative information to the vehicle control module 104. The vehicle control module 104 sets a warning notification for presence of a "pedestrian", in the warning notification module 108 (step 607). Even if the high beam lighting time is extremely short and the driver cannot visually recognize the pedestrian, a warning for presence of a "pedestrian" is provided to the driver.

Figure 6:
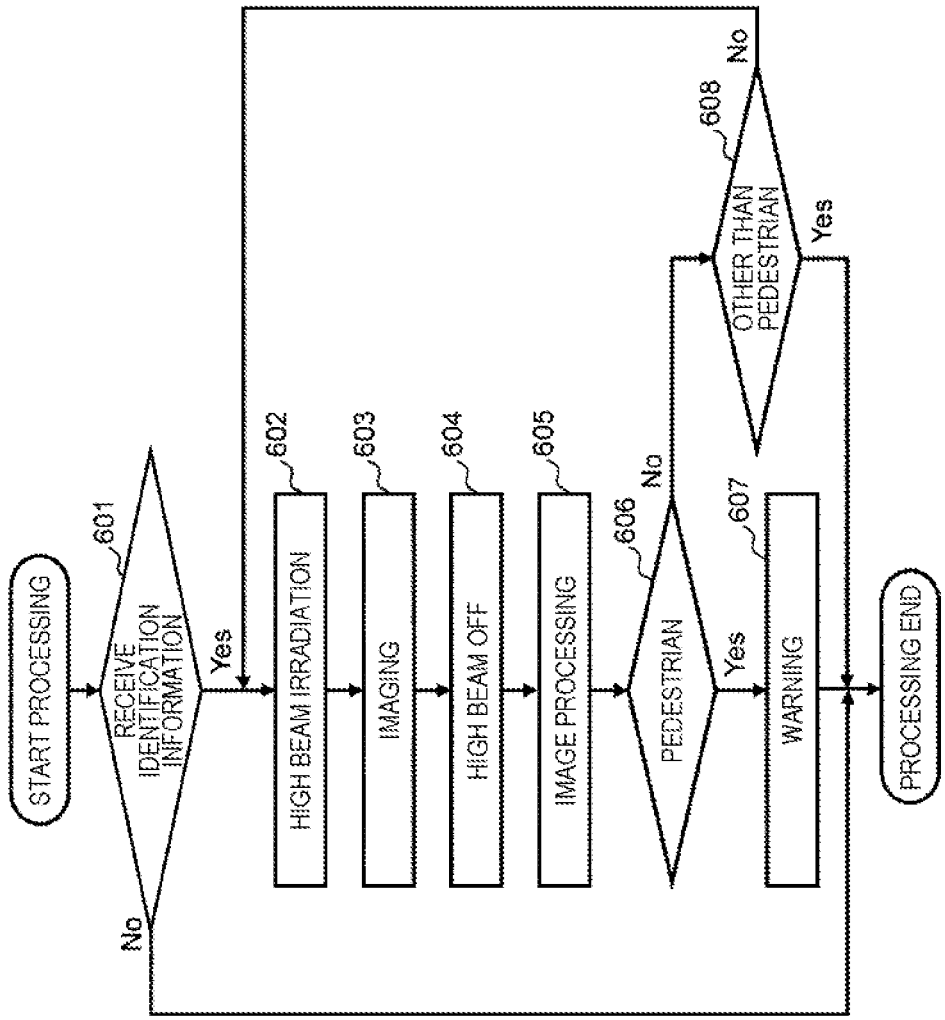
FIG. 6 is a flowchart showing an example of an operation of controlling illumination by the object detection system.

The image processing module 102 repeatedly executes the flowcharts of FIGS. 5 and 6 in accordance with, for example, the imaging cycle. When the vehicle is traveling at a speed of 40 km/h, it is calculated to travel approximately 11mper second. Assuming that a pedestrian moves at 4 km/h approximately, the pedestrian moves about 1 m per second. In consideration of the risk of jumping out of the pedestrian, the image processing module 102 only needs to execute the flowcharts of FIGS. 5 and 6 at least at intervals of one second. The imaging cycle is much shorter than this.

When the image processing circuit 202 determines that the "estimated pedestrian" is a pedestrian, the image processing circuit 202 does not light the high beam to the "estimated pedestrian". If the image processing circuit 202 cannot determine that the "estimated pedestrian" is a pedestrian, it determines whether or not the "estimated pedestrian" is one other than a pedestrian in step 608. When it is denied, the image processing circuit 202 returns to step 602, performs switching to the high beam at the next timing, and continues determination of the "estimated pedestrian".

In steps 606 and 608, the image processing circuit 202 may improve the accuracy of recognizing a pedestrian using information on the movement of an object (estimated pedestrian), that is, tracking information. Since the pedestrian has a lower moving speed than the speed of the vehicle, the distance between the pedestrian and the vehicle is gradually decreased, and the detection accuracy of the pedestrian is improved.

As described above, since a high beam lighting command is directly transmitted from the image processing module 102 to the illumination control module 106 without going through a network such as CAN, a problem of transmission delay is solved. As a result, the illumination control module 106 can turn on the high beam in alignment with the imaging timing and the imaging period of time. Even if the high beam lighting time is extremely short, the imaging module 101 can image the target object in consideration of the conditions such as the exposure time.

Figure 7:
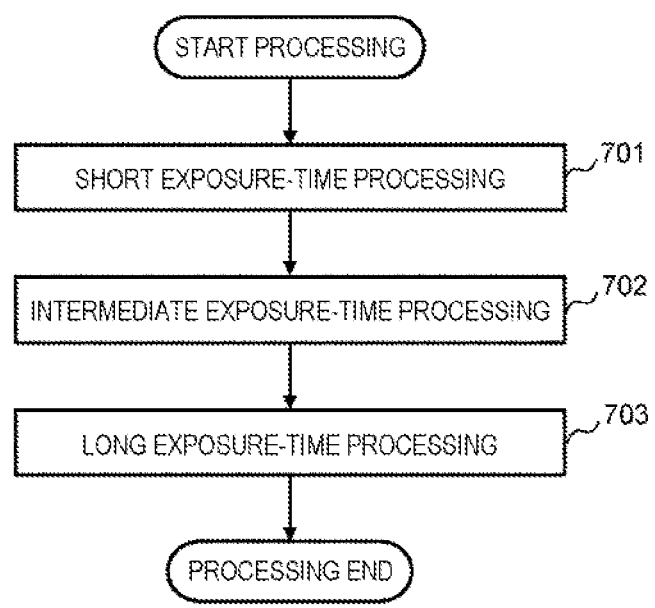
FIG. 7 is a flowchart showing an example of an operation of an imaging module.

FIG. 7 illustrates the operation of the imaging module 101 as a flowchart. The imaging module 101 images the front of the vehicle by repeating the flowchart of FIG. 7. In short exposure-time processing (step 701), the imaging module 101 performs imaging in a short exposure time to detect a headlight (oncoming vehicle) with high brightness. In intermediate exposure-time processing (step 702), the imaging module 101 performs imaging in an intermediate exposure time to detect a tail lamp (preceding vehicle) with low brightness. In long exposure-time processing (step 703), the imaging module 101 performs imaging in a long exposure time to detect a pedestrian having no light source. The illumination control module 106 puts the illumination module 107 into a high beam lighting state in accordance with the timing of imaging in a long exposure time. Since the amount of reflected light of a pedestrian is low, a relatively long exposure time is required for detection of the pedestrian. Note that these processing orders may be different from those of FIG. 7.

FIG. 8 is a timing chart of imaging and high beam lighting. 8a shows a pattern of a timing signal 801. For example, the timing signal 801 is output every 60 msec. A period between adjacent timing signals is an imaging cycle. 8b shows an imaging timing pattern. The imaging module 101 performs short exposure-time imaging in synchronization with a first timing signal (802), performs intermediate exposure-time imaging in synchronization with a second timing signal (803), and performs long exposure-time imaging in synchronization with a third timing signal (804).

8d shows the lighting timing of a high beam (far-distance irradiation). The illumination control module 106 allows the illumination module 107 to perform high bean lighting in synchronization with the third timing signal, in other words, in accordance with the long exposure-time imaging (804) for imaging of the pedestrian or by allowing it to be in synchronization with it (805). Therefore, the illumination control module 106 can limit or set the lighting of the high beam to a period for imaging of a pedestrian.

In the case where the response speed of the illumination module 107 is quick, the illumination control module 106 sets the high beam to be turned on (805) at the same timing as the long exposure-time imaging (804), as shown in 8e. The illumination control module 106 executes turning on of the high beam including the time constant $\Delta t$ in order to obtain sufficient illuminance, due to influences of the response speed of the illumination module 107 and signal delay in the circuit in the vehicle. In other words, the illumination control module 106 executes turning on of the high beam in a preceding manner by the time constant $\Delta t$ of the waveform (804) of the long exposure-time imaging of 8d. As a result, the illuminance of the high beam gradually rises as indicated by the broken line and becomes to have sufficient illuminance until the imaging is started (8e). It should be noted that since turning off of the high beam is not affected by the time constant Δt, the illumination control module 106 may execute turning on of the high beam at the same timing as turning off of the long exposure-time imaging (804).

In the mass-produced product of the illumination modules 107, it is necessary to assume an influence of individual differences. Therefore, the illumination control module 106 may execute on/off of the high beam with a margin of, for example, about 30% in addition to the time constant Δt (8*f*). As shown in 8*c*, the imaging module 101 may perform the short exposure-time 802 and the intermediate exposure-time 803 between the first timing signal and the second timing signal, and may execute the long exposure-time 804 in synchronization with the second timing.

Figure 9A:
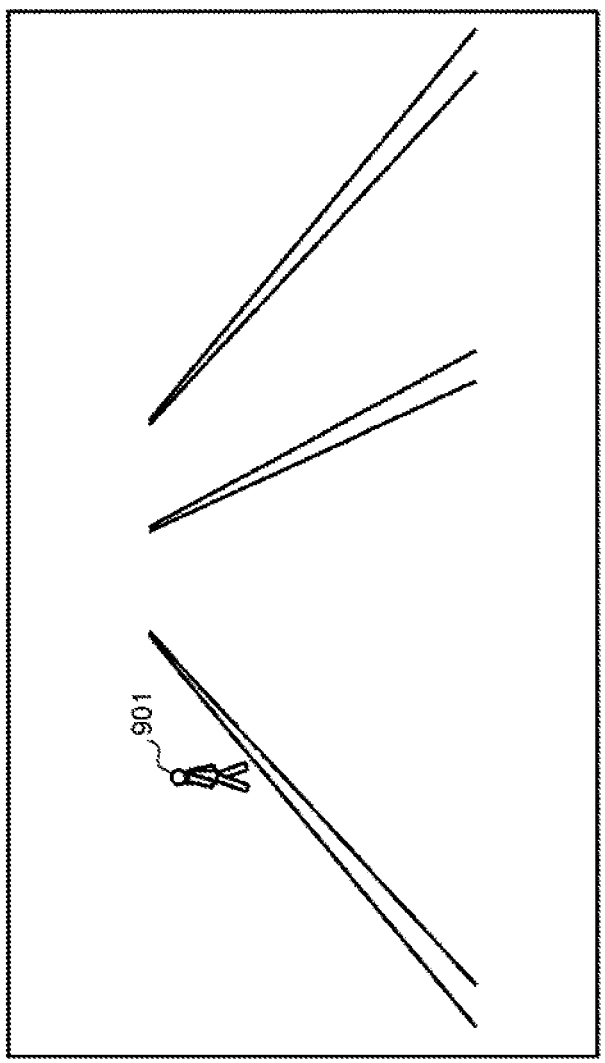
FIG. 9A is an example of a captured video during night high beam travel.

FIG. 9A shows a captured video of the pedestrian 901 during nighttime high-beam traveling. FIG. 9B shows a captured video of the pedestrian 901 during nighttime low beam traveling. According to FIG. 9A, the driver can recognize the pedestrian 901. Meanwhile, according to FIG. 9B, since the low beam does not reach far away, the distant area becomes a shading area 902 where illumination is limited, so that the driver cannot recognize the distant pedestrian 901.

FIG. 10A shows a captured video (nighttime high beam) in which a pedestrian 1001 approaches the vehicle as the vehicle travels. A reference numeral 1002 denotes a video of an oncoming vehicle. FIG. 10B is a video during nighttime low beam. As can be seen from FIG. 10B, only the feet 1003B of the pedestrian 1001 are imaged. In order to avoid dazzlement to other vehicles, the driver usually travels with a low beam, and only sees the feet of the pedestrian, and it is difficult to visually recognize it as a pedestrian. The image processing module 102 categorizes the foot video as an estimated pedestrian, applies a short-time high beam to the pedestrian to thereby illuminate the whole of the pedestrian (FIG. 10A) and determines that it is a pedestrian.

Figure 11:
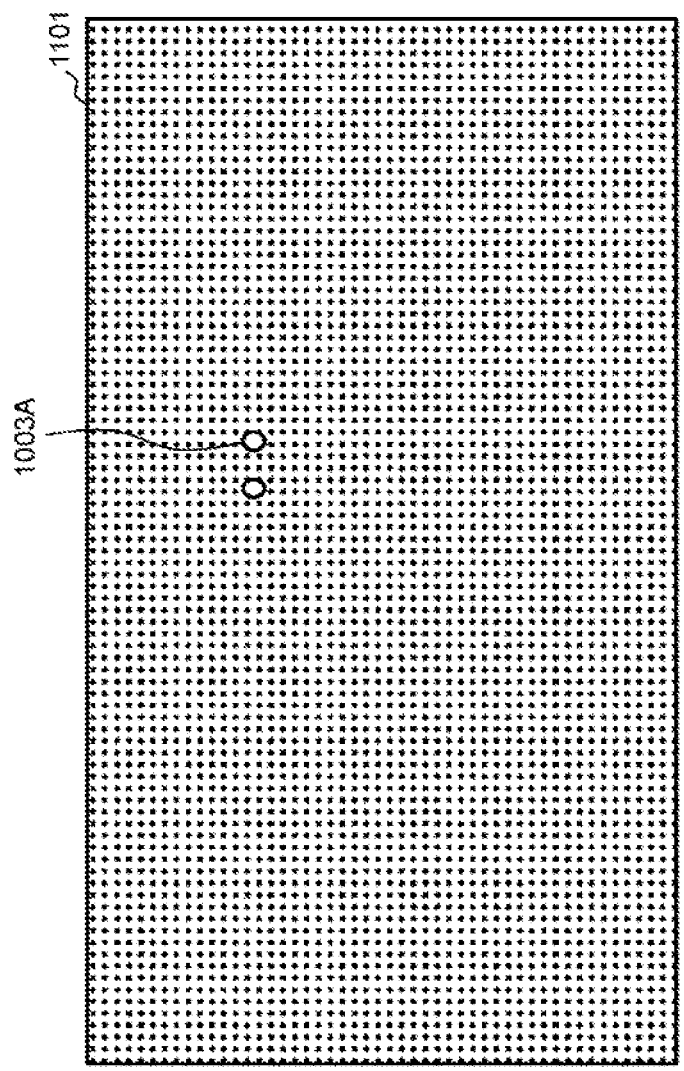
FIG. 11 is an image obtained by short-time exposure.

For detection of the oncoming vehicle, the image processing module 102 may use a light spot based on luminance information of the headlight, not as a video like recognition for a pedestrian. Even if an oncoming vehicle exists in the shading area 1003 (FIG. 10B) at the time of low beam, the image processing module 102 can detect the oncoming vehicle on the basis of a light spot 1003A of the headlight. FIG. 11 is an image obtained by short-time exposure (FIG. 8 (8*d*)). Luminance information is derived from the RGB color light receiving element components that are an array of light receiving elements, by the following conversion formula.

$Y=0.299R+0.587G+0.114B$ $U=-0.147R-0.289G+0.436B$ $V=0.615R-0.515G-0.100B$

Y represents luminance information, and U and V represent color difference signals. By using the luminance information Y as an index, the image processing module 102 can detect headlight and taillight that are sufficiently brighter than the surroundings. By limiting the exposure time, the image processing module 102 can delete the self-luminous noise around the oncoming vehicle and the front vehicle, and can detect and extract light spots such as headlights and taillights.

Figure 12:
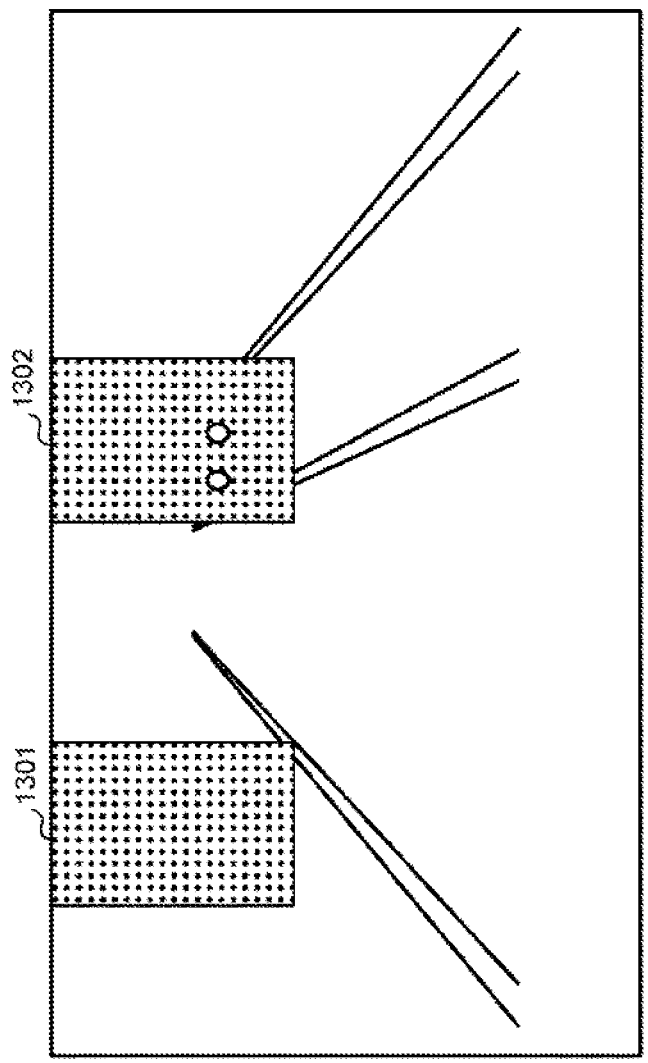
FIG. 12 is an example of a video obtained by imaging an area illuminated by an LED headlight.

In the above-described embodiment, as the illumination module 107, one having the type in which lighting of a high beam is switched between on and off or light irradiation direction is switched between low and high has been described as the entire module. However, the module is not limited thereto. For example, a headlight having a plurality of light emitting units such as LEDs may be used. In this type of illumination module, the amount of light, the direction of light, and the like can be changed for each light emitting unit. FIG. 12 is an example of a video obtained by capturing an area illuminated by an LED headlight. A reference numeral 1302 denotes an area of an oncoming vehicle, and the amount of light in this area is limited. A reference numeral 1301 denotes a pedestrian area, and the amount of light is also limited in this area. In this way, the amount of light of the LED headlight can be adjusted for each predetermined area. The amount of light being limited means that an LED corresponding to the limited area is not driven or the driving current of the LED is limited. The amount of light is limited to limit dazzlement to oncoming vehicles and pedestrians.

Figure 13:
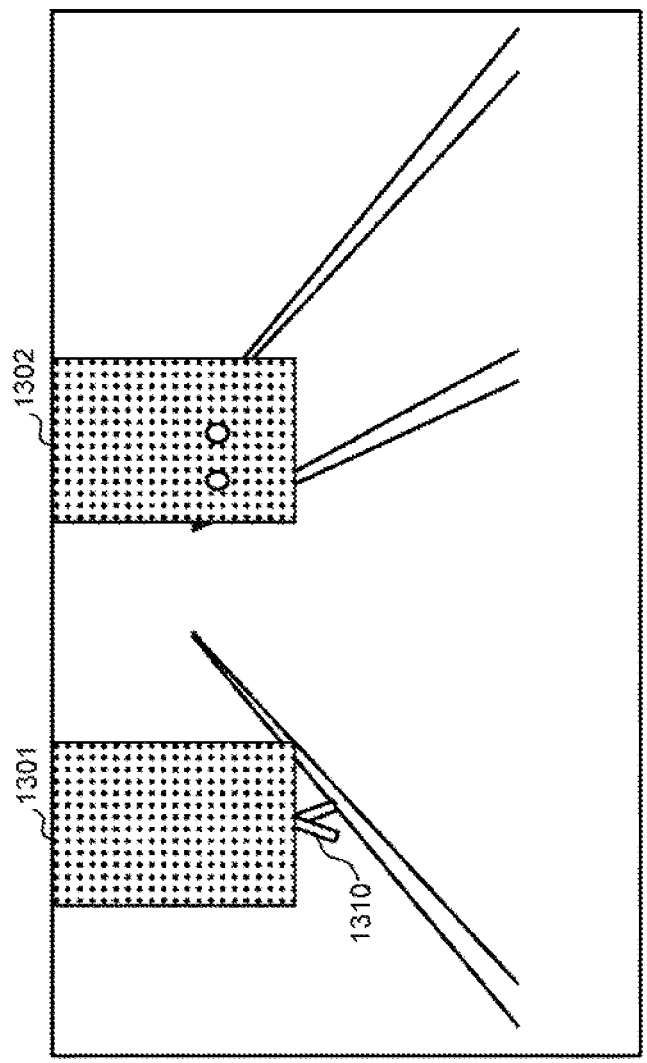
FIG. 13 is a video when the vehicle approaches a pedestrian.
Figure 14:
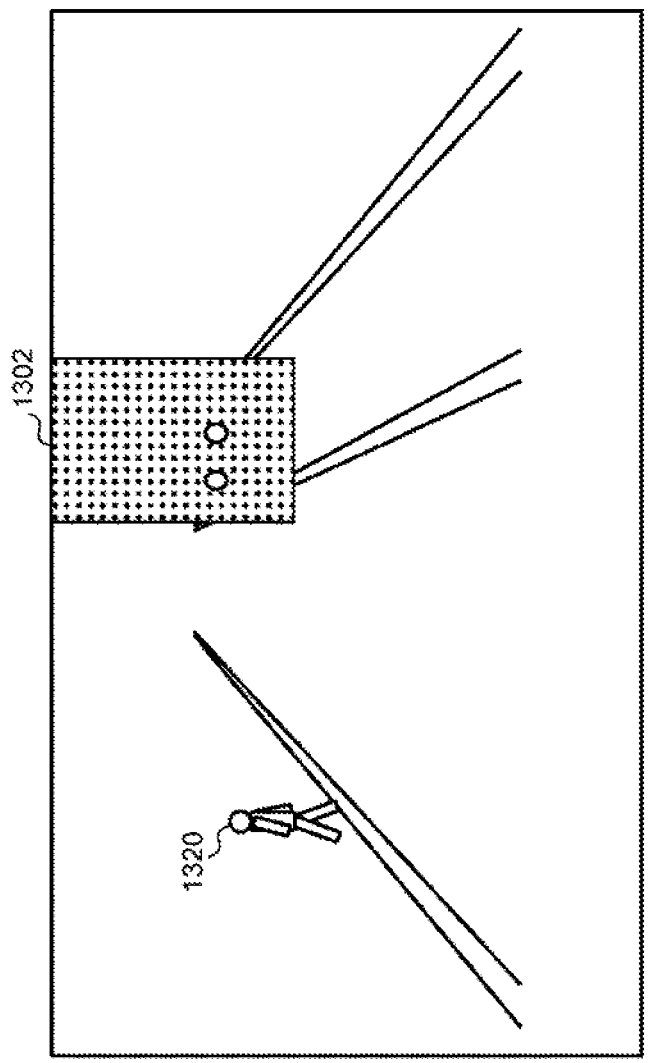
FIG. 14 is a video of the whole body of a pedestrian.

In the case where a pedestrian exists in the area 1301, when the vehicle approaches the pedestrian, as shown in FIG. 13, a video in which the lower limbs 1310 of the pedestrian are exposed from the lower end of the area 1301 is provided to the image processing module 102. When the image processing module 102 determines that this is an estimated pedestrian, the illumination control module 106 turns on the LED corresponding to the area 1301, increases the LED drive current, or changes the orientation of the LED that is not oriented to the limited area to temporarily increase the number of LEDs for illuminating the limited area, to thereby make the limited area 1301 brighter. Thus, the imaging module 101 can image the whole body of the pedestrian 1320 (FIG. 14).

Figure 15:
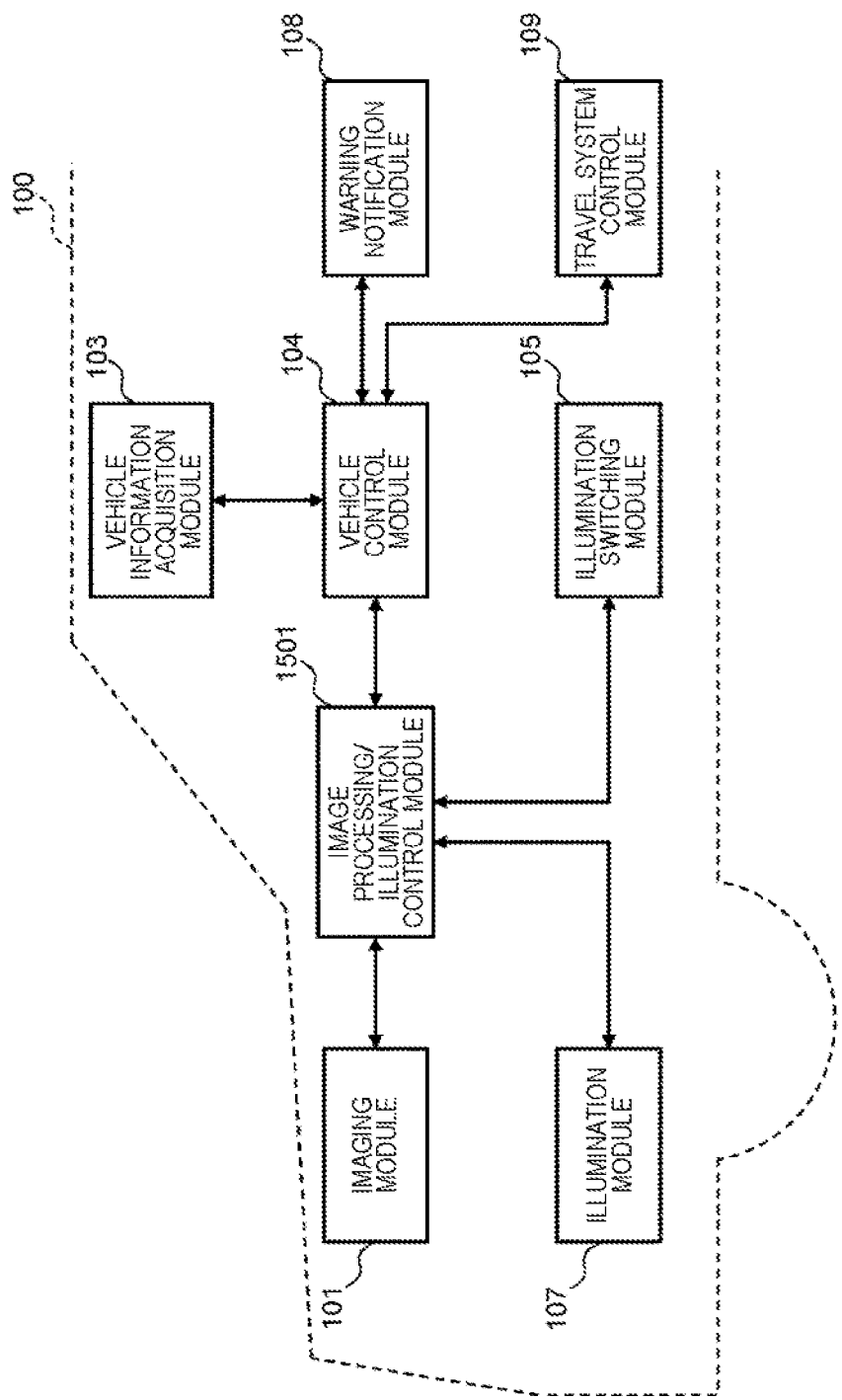
FIG. 15 is another example of a functional block diagram of the object detection system.
Figure 16:
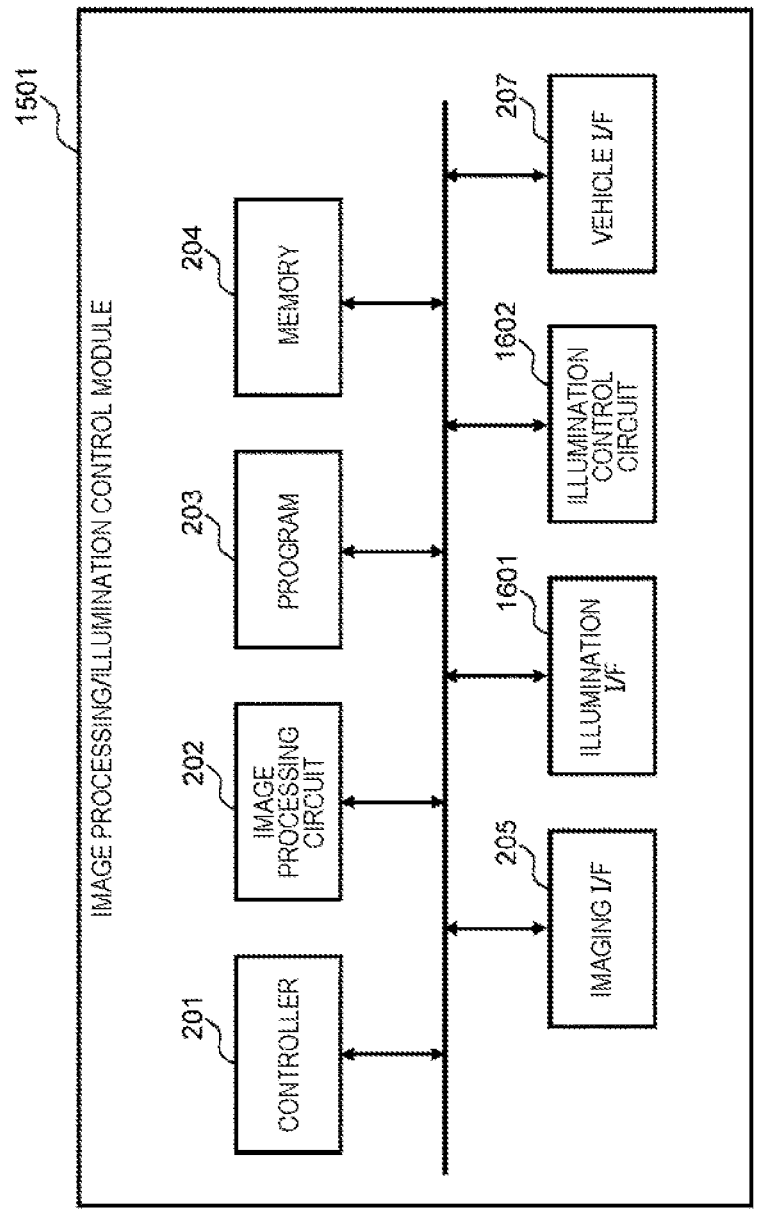
FIG. 16 is a block diagram showing a detailed configuration of an image processing/illumination control module of FIG. 15.

In the above-described embodiment, it has been described that the image processing module 102 and the illumination control module 106 are configured of different LSIs. However, as shown in FIG. 15, the image processing module 102 and the illumination control module 106 may be configured of an integrated LSI (image processing/illumination control module 1501). FIG. 16 is a detailed block diagram of the image processing/illumination control module 1501. The image processing/illumination control module 1501 includes an illumination control circuit 1602 in addition to the image processing circuit 202, and the controller 201 integrally controls them. With this configuration, on/off of the high beam is quickly and reliably controlled when the image processing circuit 202 determines the estimated pedestrian to thereby achieve both pedestrian detection and dazzlement prevention to other vehicles.

Figure 17:
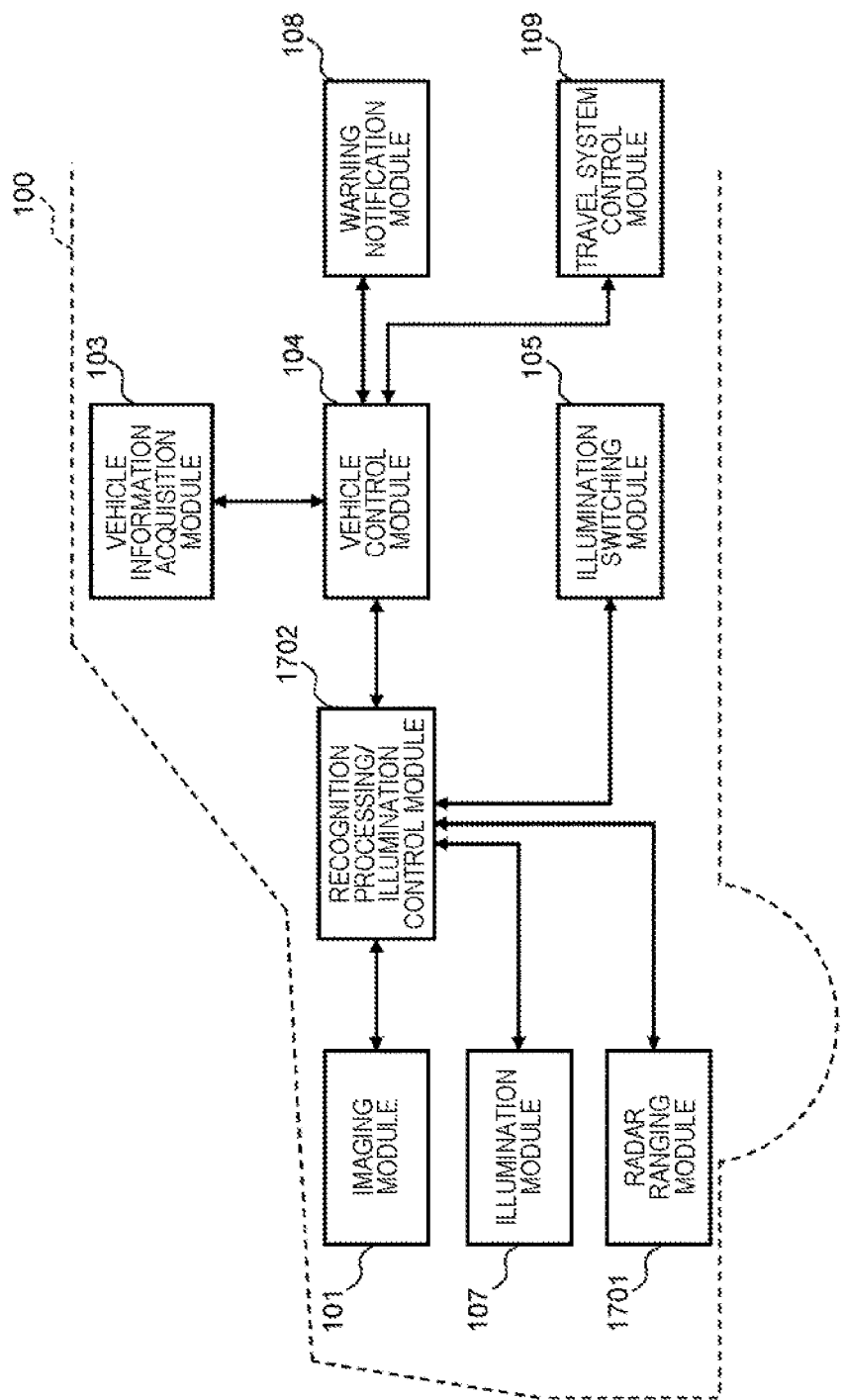
FIG. 17 is still another example of a functional block diagram of the object detection system.
Figure 18:
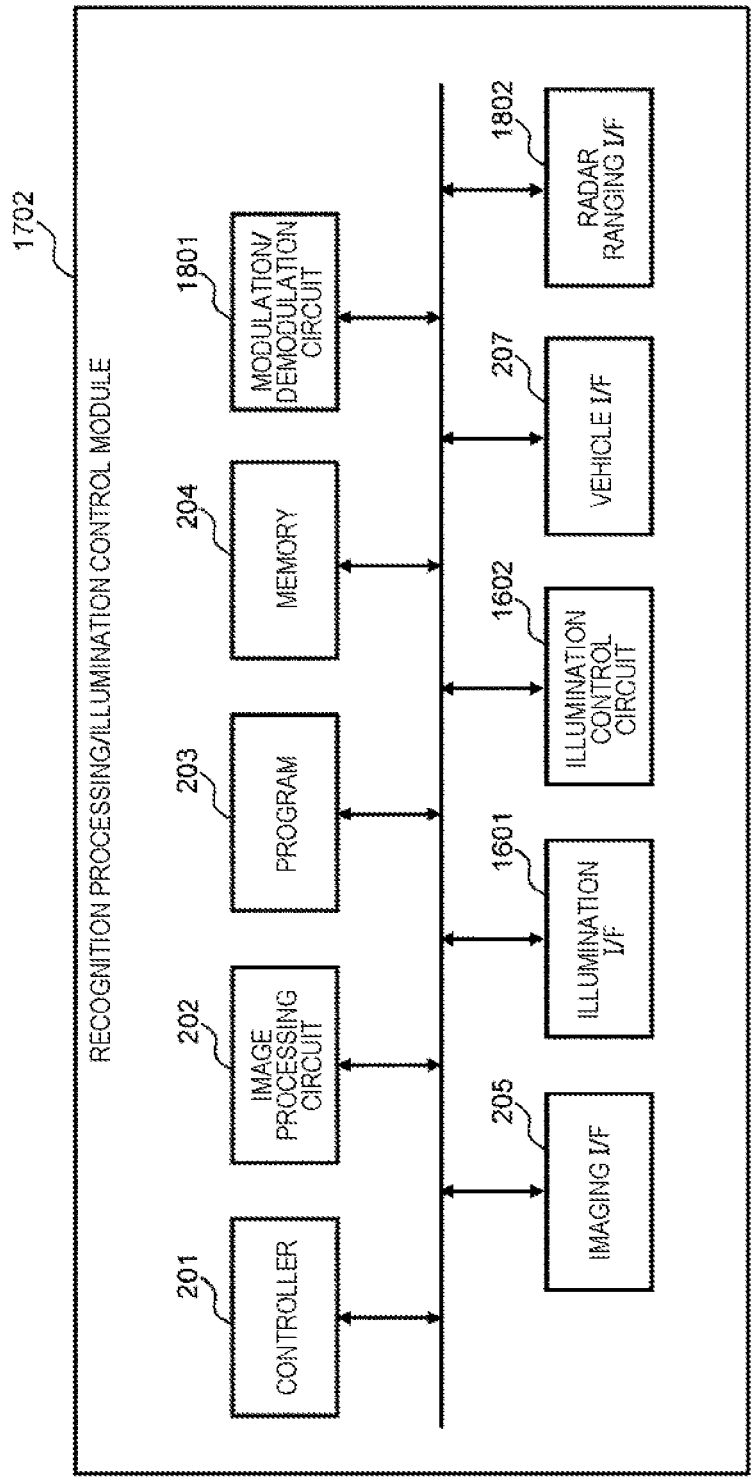
FIG. 18 is a block diagram showing a detailed configuration of the image processing/illumination control module of FIG. 17.

Further, as shown in FIG. 17, the image processing module 102 or the image processing/illumination control module 1501 may be connected to a radar ranging module 1701. The radar ranging module 1701 performs ranging by light irradiation and reception of reflected light, such as millimeter wave radar or light detection and ranging (LIDAR). The recognition processing/illumination control module 1702 provides the radar ranging module 1701 with conveyance information, performs separation control of received light signals, and also controls the illumination module 107. The recognition processing/illumination control module 1702 can confirm a three-dimensional object detected by the radar through recognition processing/illumination control. For example, the recognition processing/illumination control module 1702 temporarily irradiates a three-dimensional object detected by the radar with a high beam, performs image processing on the video captured at that time, and determines an estimated pedestrian as required, to thereby confirm that the three-dimensional object is a pedestrian. As shown in FIG. 18, the recognition processing/illumination control module 1702 includes a modulation/demodulation circuit 1801 for radar ranging and an interface 1802 to the radar ranging module 1701.

Figure 19:
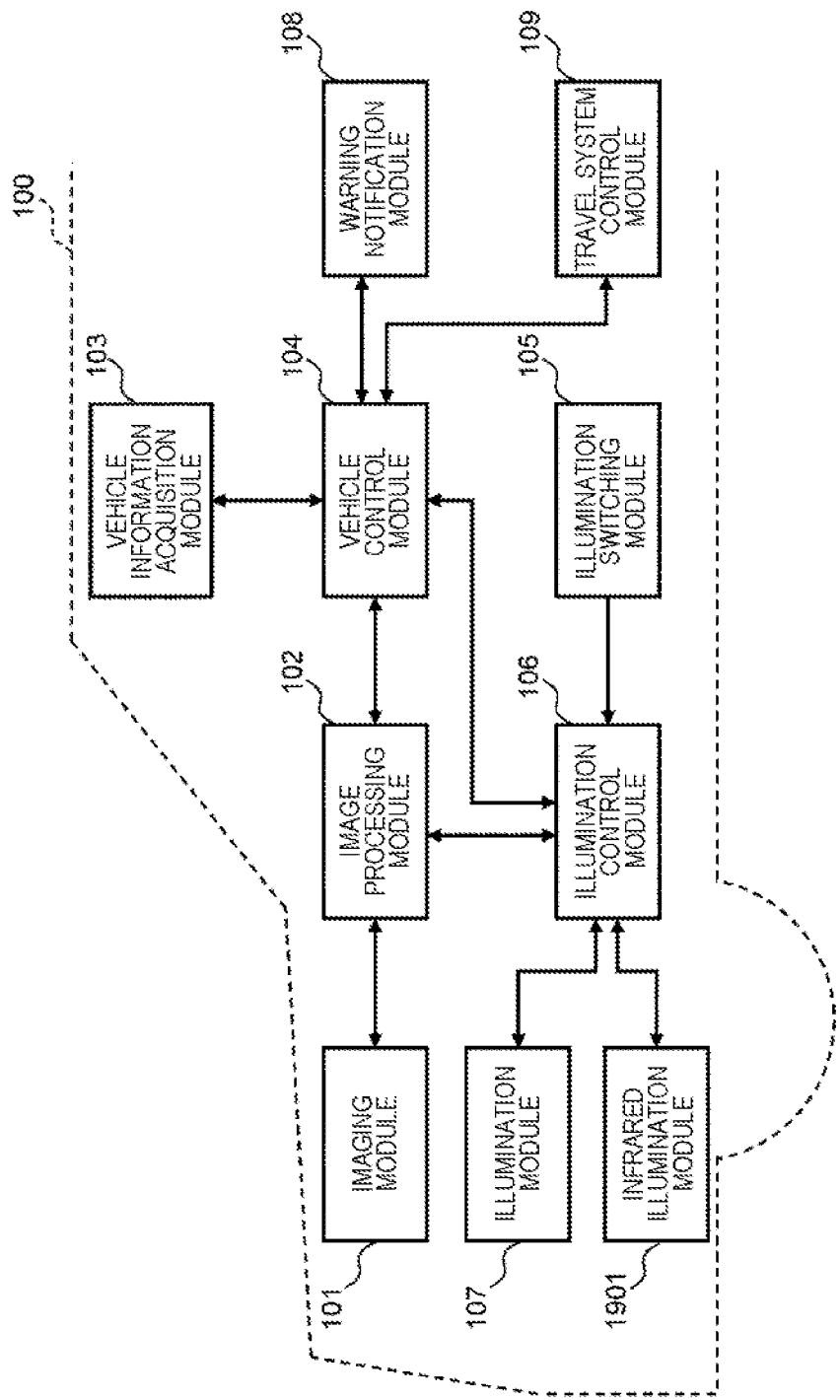
FIG. 19 is still another example of a functional block diagram of the object detection system.

As shown in FIG. 19, the object detection system 10 may include an infrared illumination module 1901 in addition to the illumination module 107 of visible light. When determining the estimated pedestrian, the image processing module 102 temporarily irradiates the estimated pedestrian with infrared light from the infrared illumination module 1901 to confirm the pedestrian. The imaging module 101 includes an infrared camera and images the target illuminated with the infrared light. The image processing module 102 may or may not perform temporary irradiation of visible light. The infrared illumination module 1901 reliably illuminates the estimated pedestrian even at night during bad weather.

Figure 20:
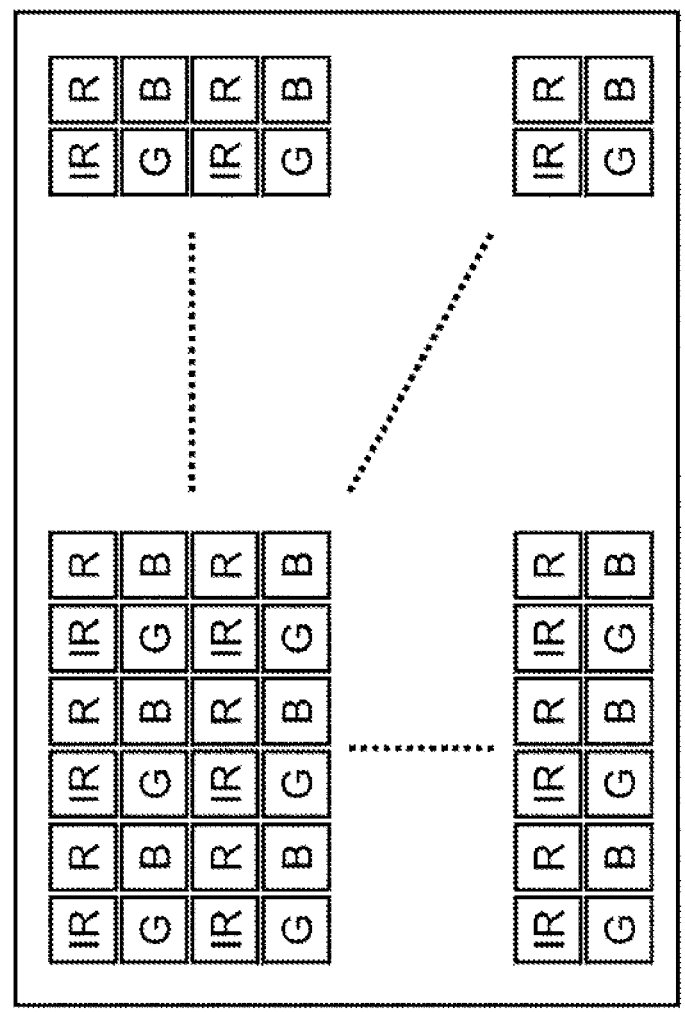
FIG. 20 is a layout view of light receiving elements of color pixels to which an infrared light receiving element is added.

To detect infrared light, an imaging element having an infrared light receiving element is required. FIG. 20 shows an arrangement of light receiving elements of color pixels to which an infrared light receiving element (IR) is added. Except for detecting the infrared light component by the IR pixel, it is the same as the light receiving element of the color pixel in FIG. 3.

Figure 21:
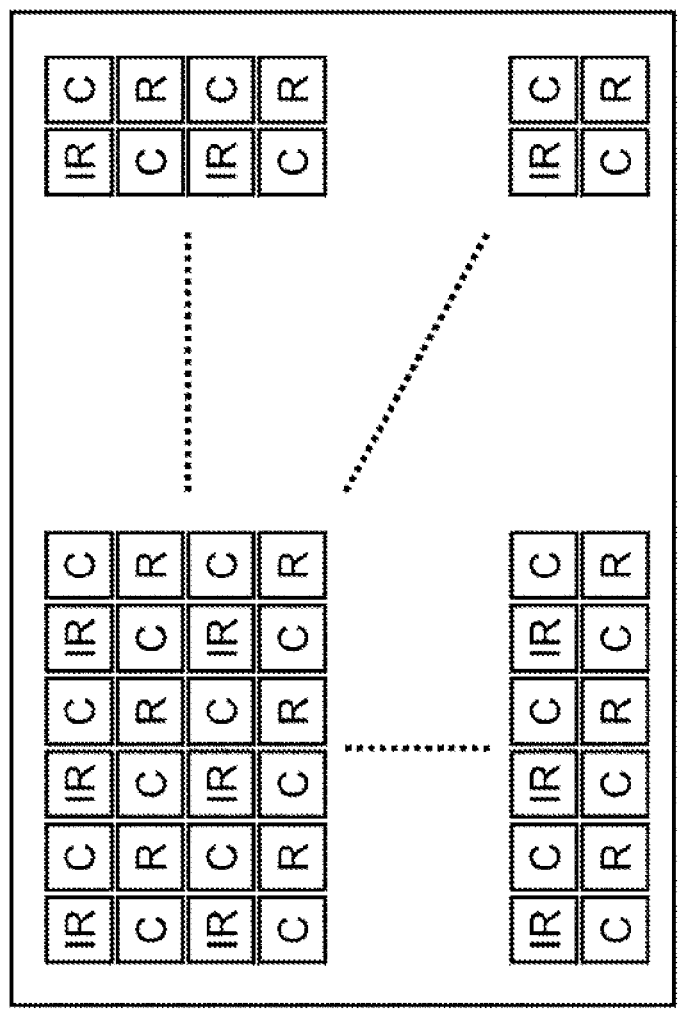
FIG. 21 is a layout view of light receiving elements including clear pixels.

A configuration using clear pixels (C) is shown in FIG. 21. Clear pixels are nested in the infrared light receiving elements and the red light receiving elements. With this arrangement, it is possible to realize an imaging element that can receive the clear pixels evenly over the entire screen and can detect the infrared components and the red component as well.

Note that the present invention is not limited to the above-described embodiment, but includes various modifications. For example, the above-described embodiment is described in detail to explain the present invention in an easy-to-understand manner, and is not necessarily limited to one having all the described configurations. Further, part of the configuration of one embodiment can be replaced with the configuration of another embodiment, and the configuration of another embodiment can be added to the configuration of one embodiment. Moreover, it is possible to add, delete, and replace other configurations for part of the configurations of the respective embodiments.

Each of the above-described configurations, functions, processing units, processing means, and the like may be realized by hardware by designing a part or all of them with, for example, an integrated circuit. Further, each configuration, function, and the like described above may be realized by software by the processor interpreting and executing a program that realizes each function. Information such as programs, tables, and files for realizing each function can be stored in a memory, a hard disk, a recording device such as a solid state drive (SSD), or a recording medium such as an SD card.

Further, regarding control lines and information lines, those considered to be necessary for the description are shown, and all control lines and information lines in the product are not necessarily shown. In practice, almost all configurations may be considered to be mutually connected.

REFERENCE SIGNS LIST

10 object detection system
100 in-vehicle device
101 imaging module
102 image processing module
106 illumination control module
107 illumination module

The invention claimed is:

1. An object detection system that detects an object outside a vehicle and provides a control device of the vehicle with detection information, the system comprising:
   an illumination module for illuminating the object;
   an illumination control module that controls the illumination module;
   an imaging module that images the object; and
   an image processing module that processes an image in which the object is captured, wherein
   in accordance with timing at which the imaging module images an object in a limited-illumination area, the illumination control module controls start and end of illumination to the limited-illumination area by the illumination module on a basis of a result of image processing by the image processing module,
   the imaging module performs: i) a first exposure-time imaging in synchronization with a first timing signal, ii) a second exposure-time imaging in synchronization with a second timing signal, and iii) a third exposure-time imaging in synchronization with a third timing signal,
   the first exposure-time is shorter than the second exposure-time, and the second exposure-time is shorter than the third exposure-time,
   when a response speed of the illumination module is faster than a given value, the illumination control module sets a high beam to be turned on at the same timing as the third exposure-time, and the first exposure-time, the second exposure-time and third exposure-time occur in order from shortest to longest.

2. The object detection system according to claim 1, wherein
   when the image processing module determines that there is a possibility that an image in which the object is captured is an image of a specific target object,
   the image processing module allows the illumination control module to control the start and the end of illumination to the limited-illumination area in accordance with the timing at which the imaging module images the object in the limited-illumination area.

3. The object detection system according to claim 2, wherein
   the imaging module images the object with illumination to the limited-illumination area, and
   the image processing module determines whether or not the image in which the object is captured is an image of the specific target object.

4. The object detection system according to claim 1, wherein
   the illumination module is configured to be switchable between a first illumination state and a second illumination state, and
   the illumination control module executes illumination to the limited-illumination area in the second illumination state.

5. The object detection system according to claim 2, wherein
   when the image processing module determines that the image in which the object is captured is an image of a part of the specific target object,
   the image processing module determines that there is a possibility that the image is an image of the specific target object.

6. The object detection system according to claim 4, wherein
   in the first illumination state, the illumination module illuminates a front of the vehicle, and in the second illumination state,
the illumination module illuminates a place farther than a place illuminated in the first illumination state.

7. The object detection system according to claim 4, wherein the limited-illumination area is an area that is not illuminated in the first illumination state but is illuminated in the second illumination state.

\* \* \* \* \*